April 6, 1954
J. D. RUSSELL
2,674,365
FLIGHT CONVEYER CHAIN
Filed Sept. 12, 1951
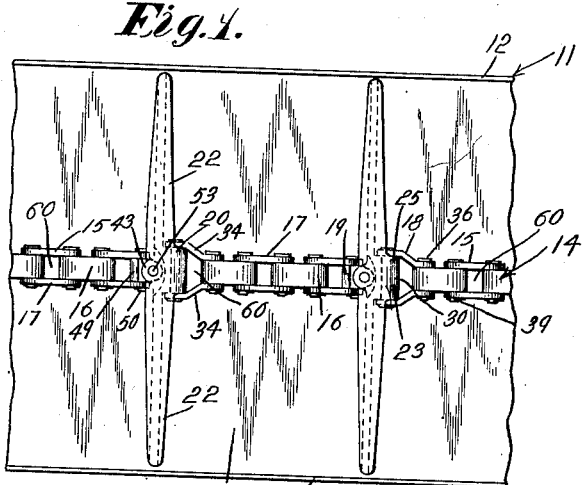
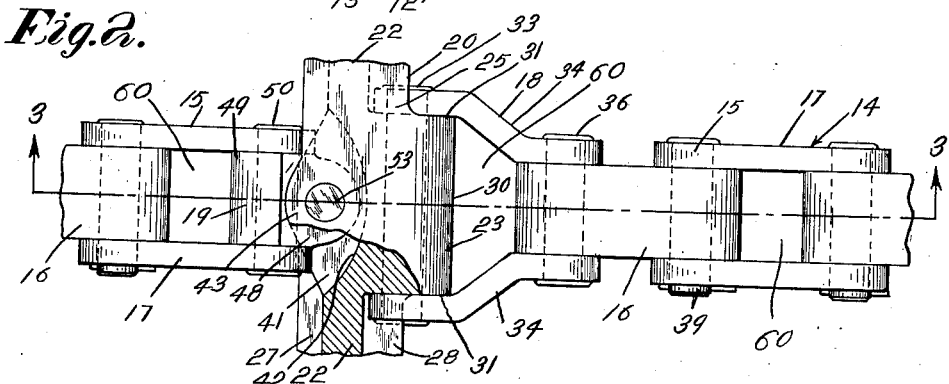
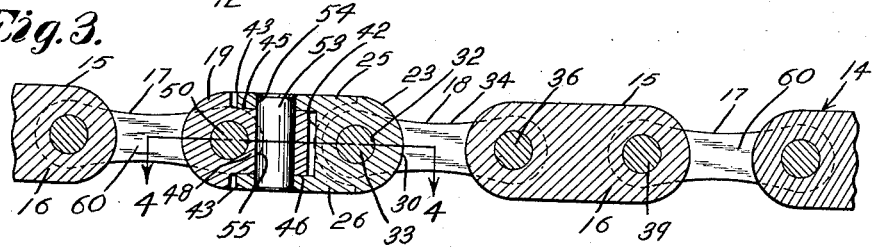
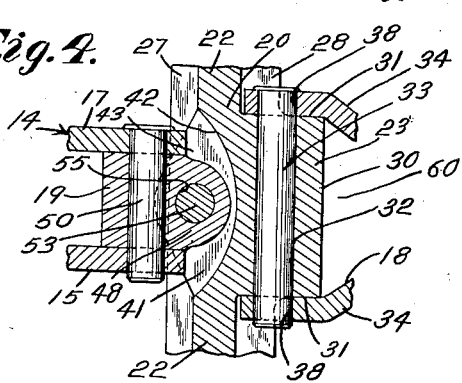
Inventor:
John L. Russell.
by
Ennis A. Maxson.
Attorney.

Patented Apr. 6, 1954

2,674,365

UNITED STATES PATENT OFFICE 2,674,365

FLIGHT CONVEYER CHAIN

John D. Russell, Franklin, Pa., assignor to Joy Manufacturing Company, Pittsburgh, Pa., a corporation of Pennsylvania Application September 12, 1951, Serial No. 246,303

10 Claims. (Cl. 198—176)

This invention relates to conveyor chains, and particularly to such chains of the flight type with center chain.

There is wide use of conveyor chains which comprise a central chain with flights extending oppositely from the opposite sides of the central chain. It is desirable that these chains be made as rugged and of as simple construction as possible. It is necessary that there be very complete flexibility of the chain in the planes of its orbit of movement, but it will suffice, in many cases, if there be provided lateral flexibility only at one of the connections of a pair of laterally inflexible short chain section with a flight couple which is intermediate and serves to connect two such short chain sections. In other words a pair of oppositely horizontally extending flights may be connected, at one side, by a horizontal pivot only, to a relatively short chain section which is inflexible laterally, while at the other side such pair is connected by a vertical pivotal connection and a horizontal pivotal connection to another relatively short chain section which is also laterally inflexible. This feature of a single vertical pivot (vertical when the flights extend horizontally) is an important feature. The flights of each pair may be integrally connected together or a plural part construction may be used. In any event the unit, so-to-speak, may include a lateral lug-like portion or boss midway between its ends pivotally connected, by a pin which extends parallel to the flights (when these are alined), to desirably diverging link elements which are in turn secured by a parallel pin to a laterally stiff chain section extending to the next flight. In other words, the axis of such pin, the axis of pivotal connection of such diverging link elements to the laterally stiff chain section, and the axes of pivotal connection between the elements of the laterally stiff chain section may all be parallel. At the side of the flight pair away from the pin mentioned, the flight unit—or at least its central portion—may be recessed to receive a tongue-like portion of an element which is pivotally secured, by means of a pivot parallel to the axes of pivotal connection of another laterally stiff chain section, to another such laterally stiff chain section. Connection between the tongue-like portion and the flight unit will be by means of a pivot normal to the path of chain circulation—i. e. at right angles to a plane in which the axes of the last preceding pivot and of the pin engaged by said diverging link elements are disposed. The recess, and any adjacent portions of the flight unit adjacent the tongue-like portion will be so formed as to preclude interference when one of the relatively short, laterally stiff chain sections connected by an intermediate flight unit, is swung laterally relative to the other. The dimensions and spacing will be such that consecutive sprocket teeth on a drive sprocket can receive between them a flight-carrying block and the chain element which is pivotally connected to it on a vertical axis.

It is an object of this present invention to provide an improved conveyor chain. It is another object to provide an improved conveyor chain of the flight type and of requisite flexibility while employing a minimum number of pivotal connections. It is still another object of my invention to provide an improved flight unit. It is a further object of my invention to provide an improved flight unit having improved pivotal connections with relatively short laterally inflexible chain portions which are connected by said flight unit. Other objects and advantages of the invention will hereinafter more fully appear.

In the accompanying drawings in which one illustrative embodiment which the invention may assume in practice is shown:

Fig. 1 is a fragmentary top view of a portion of a flight conveyor chain and its associated trough.

Fig. 2 is a considerably enlarged view with parts broken away and others broken off, showing one embodiment of the invention.

Fig. 3 is a longitudinal central vertical section on the plane of the line 3—3 of Fig. 2.

Fig. 4 is a detail horizontal sectional view on the plane of the line 4—4 of Fig. 3.

Referring to the drawings, and first to Fig. 1, it will be observed that a conveyor trough 11 has side flanges 12 and a deck plate 13; and a conveyor chain generally designated 14 is adapted to traverse the surface of this deck plate 13 and move material along it. The chain 14 includes, as illustrated, short, laterally inflexible chain sections 15, 15, herein each illustrated as comprising a couple of chain blocks 16 and a couple of pairs of side links 17 and each having at its opposite ends connections respectively designated 18 and 19, with flight units 20.

The flight units 20, as herein illustrated, are shown as of integral construction (though they may include separable lugs secured to a block) and include oppositely extending flight portions 22, 22 and an intermediate central block or lug portion 23. The flight portions 22 extend oppositely from the central block or lug portion 23 and are shown as comprising upper and lower relatively wide, mutually oppositely spaced flight portions 25 and 26, with the result that the flight portions have their material-engaging and their receding sides each longitudinally recessed as at 27 and 28. The central lug portion 23 includes a rearward (in terms of chain movement) block or lug portion 30, engageable by a sprocket tooth and somewhat wider as shown than the width of the laterally stiff chain sections 15, 15 and having parallel opposite side surfaces 31 and being bored, or otherwise suitably formed, at 32, to receive a pin 33 which connects laterally diverging link elements 34, which form a portion of the connection 18 with the block or lug portion 30, while another pin 36 connects the less widely spaced ends of the links 34 to the adjacent end of a chain block 16. The pin 33 is suitably held, as by heading over, welding or the like, against escape from its position in the bore 32 and in recesses 38 in the more widely spaced ends of the diverging links 34. It will be noted that the pin 33 has its axis parallel to the axis of a pin 39 which connects chain blocks 16 and side links 17 together, and it will be noted that the connection between the flight block and the adjacent, herein rearwardly disposed, chain section 15 are inflexible in directions transverse to the planes of circulation of the flight conveyor, but are freely flexible in such planes.

At the other side thereof, the central portions 23 of the flight units 20 are each provided with an arcuate recess 41 having an arcuate inner wall 42 and lying between lips or ears 43, herein shown as integral with the units 20. The recess has fairly widely spaced upper and lower walls 45 and 46 in the position shown in Fig. 3. These are adapted to receive between them a projecting lug 48 formed on a connector element 49 received between the side links 17 of the laterally stiff chain section 15 immediately ahead of flight unit 20 and pivotally connected with said side links by a pin 50. The pin 50 will be noted to be parallel to the pin 33. A pin 53 extends through openings 54 in the ear portions 43 and through a coaxial opening 55 in the lug portion 48. The various pins are suitably headed over, upset, or otherwise secured against accidental loss with resultant release of the parts which they connect. The recesses 41 are wide and deep enough to permit all of the lateral swinging necessary between the parts connected by the pins 53.

The mode of operation of the chain will be readily understood from what has been said. It circulates in planes extending longitudinally of and at right angles to the deck plate 13. It includes between each pair of chain blocks 16, and between the rearward surface of the lug portion 30 and the nearest chain block 16 recesses 60 in which sprocket teeth are adapted to engage to drive the chain and effect its circulation. Little lateral flexibility in the chain is necessary comparatively speaking, even though it be used with a trough structure having portions connected with each other for relative lateral swinging, and the pivotal connection provided by the pin 53, the ears 43 and the lug 48 provide all of the necessary lateral flexibility. The arcuate recess 41 provides assurance against interference between the most adjacent forwardly disposed side links 17 and the flight unit. The arrangement of the divergent links results in a strong pivotal connection between them and block or lug portions 30. No recess for the reception of a sprocket tooth is required between the flights on the block portion which supports them. Accordingly, a strong and desirable structure well adapted for its purpose is provided.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. A chain including a plurality of sections each comprising link elements pivotally connected together to provide flexibility only in the planes of the chain orbit, and means for connecting said sections including flight carrying blocks each having at least one flight rigidly connected thereto and each connected at one end thereof with a terminal element of a chain section as aforesaid on an axis parallel to the axes of pivotal connection of the link elements of said section, and each having between its other end and another chain section as aforesaid a pivotal connection, of which the axis is perpendicular to a line extending transversely of such block, with a terminal element of said another chain section.

2. A chain including a block constituting the sole support for, and having rigidly connected to it, oppositely extending flights, said block having at one side thereof a pivotal connection with the most proximate element of a chain section, said pivotal connection comprising opposite links each connected on an axis parallel to the direction of extension of said flights both with said block and with such most proximate chain element, and said block having at the other side thereof with respect to said flights, a direct pivotal connection with another chain element, said last mentioned pivotal connection including a pivot on an axis transverse to the direction of extension of said flights.

3. In a chain providing equally separated spaces for the reception of sprocket teeth, a flight carrying block having a universal connection with a section of chain at one side of it, the overall width of said block and of said universal connection equal to the distance between a pair of sprocket teeth and said block supporting the flight thereof with its longitudinal axis substantially midway of one of said spaces when said block lies within said one of said spaces.

4. In a flight conveyor, a flight carrying block portion having chain sections at each side of it and pivotal connections between said block portion and said sections including, at one side of said block portion, a pivot transverse to the direction of flight extension and at the other side of said block portion pivotal connections with the block only at points more widely spaced than the width of said chain sections, each of said pivot and pivotal connection including a pivot pin traversing said block.

5. In a flight conveyor chain, a flight-supporting connection between adjacent sections of chain including elements respectively pivotally connected on parallel axes to adjacent chain sections, one having a projecting lug, and the other a recess receiving said lug, and one of said elements supporting a flight, and a pin perpendicular to the plane in which said parallel axes lie pivotally connecting said lug and said recessed element, said recessed element having the recess therein having its deepest point near the central longitudinal line of the flight.

6. In a flight conveyor chain, a flight-supporting connection between adjacent sections of chain including elements respectively pivotally connected on parallel axes to adjacent chain sections, one having a projecting lug, and the other a recess receiving said lug, and one of said elements supporting a flight, and a pin perpendicular to the plane in which said parallel axes lie pivotally connecting said lug and said recessed element, said recess shaped to provide for lateral flexure about said pin between said elements and having the deepest portion thereof adjacent the central longitudinal line of the flight.

7. As an article of manufacture, a flight structure including a central block and oppositely extending flights attached thereto, said block adapted to be connected between chain portions and having at one side thereof a boss engageable by a chain sprocket tooth and traversed by a pivot pin-receiving opening and said block having at the other side thereof spaced lip portions separated by a recess for the reception of a connecting chain element, said lip portions traversed by alined pin-receiving openings having their axes at right angles to a line parallel to the axis of said pivot pin opening, said flights disposed with the longitudinal axes thereof in lines extending between the axes of said first and second pin-receiving openings.

8. As an article of manufacture, a flight structure including a central block and oppositely extending flights attached thereto, said block adapted to be connected between chain portions comprising central and parallel side links and having at one side thereof a boss wider than the distance between the outer sides of the parallel side links of the chain portions to be connected to it and engageable by a chain sprocket tooth and traversed by a pivot pin opening and said block having at the other side thereof spaced lip portions separated by a recess for the reception of a connecting chain element, said lip portions traversed by alined pin-receiving openings having their axes at right angles to a plane in which the axis of said pivot pin opening lies and which lies between the top and bottom of said block.

9. A flight construction adapted to be connected to, and between, a pair of side links and a center link of a side and center link chain, said flight construction including an element pivotally connected to a pair of side links of such a chain and a flight-carrying block constituting the sole support for at least one flight and having the latter rigidly connected thereto, said flight-carrying block having thereon and widely spaced transversely thereof pivot mountings for links connectible to a center link of a chain as aforesaid, and said element pivotally connected to a pair of side links having a lug and said flight-carrying block having a recess receiving said lug, and a pivot pin traversing said lug and secured to said flight-carrying block.

10. A flight construction adapted to be connected between a pair of side links and a center link block of a side link and center block chain including an element pivotally connected to a pair of side links, a flight carrying block having widely spaced mountings for links connectible to a center link block of a chain, said element having a lug and said flight-carrying block having a recess receiving said lug, and a pin pivotally traversing said lug and secured to said flight carrying block, the overall width of said element and said flight carrying block equal to the length of a chain block, said flight-carrying block having solely supported thereon at least one flight and said flight having its longitudinal center line intersecting said flight-carrying block between its ends.

References Cited in the file of this patent

UNITED STATES PATENTS

| Number | Name | Date |
| --- | --- | --- |
| 1,453,702 | Carstens | May 1, 1923 |
| 1,920,500 | Garcia | Aug. 1, 1933 |
| 2,450,501 | Clarkson | Oct. 5, 1948 |
| 2,512,610 | Cartlidge | June 27, 1950 |
| 2,571,724 | Keeney | Oct. 16, 1951 |